(12) United States Patent
Glenn

(10) Patent No.: US 7,184,084 B2
(45) Date of Patent: Feb. 27, 2007

(54) METHOD AND APPARATUS FOR IMAGE SENSING WITH CCD

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 542 days.

(21) Appl. No.: 10/085,633

(22) Filed: Feb. 26, 2002

(65) Prior Publication Data

US 2002/0158981 A1    Oct. 31, 2002

Related U.S. Application Data

(60) Provisional application No. 60/271,626, filed on Feb. 26, 2001.

(51) Int. Cl.
*H04N 5/335*    (2006.01)
*H04N 9/04*    (2006.01)

(52) U.S. Cl. .................. 348/311; 348/312; 348/303

(58) Field of Classification Search ............. 348/311, 348/302, 317, 312, 303
See application file for complete search history.

(56) References Cited

U.S. PATENT DOCUMENTS

| | | | | |
|---|---|---|---|---|
| 5,493,335 | A | * | 2/1996 | Parulski et al. .......... 348/231.6 |
| 5,754,229 | A | * | 5/1998 | Elabd ........................ 348/319 |
| 5,896,172 | A | * | 4/1999 | Korthout et al. ............ 348/248 |
| 6,118,481 | A | * | 9/2000 | Hamada ................... 348/220.1 |
| 6,829,008 | B1 | * | 12/2004 | Kondo et al. ................ 348/302 |

* cited by examiner

*Primary Examiner*—Lin Ye
(74) *Attorney, Agent, or Firm*—Martin Novack

(57) ABSTRACT

A method for producing electronic video signals representative of a focused moveable image includs the following steps: providing a charge coupled device, masking substantially less than half of the lines of the device to form a masked storage area and a substantially larger unmasked sensing area; disposing the sensing area in the path of the image; providing a shutter for periodically blocking the image from the sensing area; and providing clocking signals to the device to shift sensed lines of the image from the sensing area to the storage area and to clock image representative electronic video signals out of the device.

8 Claims, 2 Drawing Sheets

METHOD AND APPARATUS FOR IMAGE SENSING WITH CCD

RELATED APPLICATION

The present Application claims priority U.S. Provisional Patent Application No. 60/271,626, filed Feb. 26, 2001, and said Provisional Application is incorporated herein by reference.

FIELD OF THE INVENTION

This invention relates to improvements in CCD image sensors and to application of such image sensors in a video camera system that can be utilized, for example, in an electronic cinema camera and such an electronic camera as used in motion picture film origination.

BACKGROUND OF THE INVENTION

Color motion pictures are often made by shooting the action with a film camera, converting the images to digital form, computer processing the digital images, and then scanning the processed images back onto film for release. It would be advantageous to have a practical electronic color video camera that could directly shoot the action to obtain color video from which good quality color motion picture film could ultimately be produced, but this has not yet been commercially achieved on a significant scale. In copending U.S. patent applications Ser. Nos. 09/653,983 and 09/954,969, both assigned to the same assignee as the present application, there are disclosed various features that improve the practical viability of electronic film origination. The present invention relates to image sensing CCD's that can be employed in electronic cinema cameras, including, but not limited to, the type thereof that may be used for film origination.

In an electronic cinema camera a mechanical shutter is used so that the exposure time is about half the frame interval. This is to prevent too much motion blur for moving objects. A frame transfer CCD needs a shutter to shut the light off while the charges are being transferred from the sensing area to the storage area. This prevents vertical smear in the image. In a full frame CCD (as is used in digital still cameras) there is no storage area. The image is clocked out of the sensing area in the dark while the shutter is closed.

In the electronic cinema camera, the HDTV standard that is used is 1920×1080 pixels. A common CCD that is manufactured is 2048×2048 pixels. If half of these pixels are used for the storage area, then the sensing area would be 2048×1024. This is not quite the number of lines in the standard.

In a film motion picture camera, the viewfinder has a slightly larger field of view than the recorded frame. In that way the camera operator can see if something is about to get into the recorded image that shouldn't be there (like a mike boom, for example). It would be desirable for an electronic cinema camera to have a little overscan to provide this same function, and it is among the objects of the present invention to achieve this.

It is among the further objects of the invention to provide an electronic video camera and method, and a CCD sensor for same, that can operate with improved efficiency.

SUMMARY OF THE INVENTION

In a form of the present invention, the foregoing objectives are achieved by employing a charge coupled device (CCD) that operates as a hybrid between frame transfer and full frame modes.

In accordance with a form of the invention, a method is set forth for producing electronic video signals representative of a focused moveable image, including the following steps: providing a charge coupled device, masking substantially less than half of the lines of the device to form a masked storage area and a substantially larger unmasked sensing area; disposing the sensing area in the path of the image; providing a shutter for periodically blocking the image from the sensing area; and providing clocking signals to the device to shift sensed lines of the image from the sensing area to the storage area and to clock image representative electronic video signals out of the device.

In a preferred embodiment of this form of the invention, the step of providing clocking signals to the device includes providing a first vertical clock, a second vertical clock, and a pixel rate clock. The first vertical clock is operative to shift lines in the sensing area and said second vertical clock is operative to shift lines in the storage area. In this embodiment, the substantially larger unmasked sensing area includes at least 55 percent of the lines of the device. Also in this embodiment, during a vertical blanking period after shutter closure, lines are shifted from the sensing area to fill the storage area using the first and second vertical clocks at relatively high speed and during the remainder of the shutter closure time further lines are shifted from the sensing area to the storage area and lines are shifted through the storage area and read out using the first and second vertical clocks at relatively low speed, and after shutter opening, lines in the storage area are read out using the second clock at a relatively low speed.

Further features and advantages of the invention will become more readily apparent from the following detailed description when taken in conjunction with the accompanying drawings.

DETAILED DESCRIPTION

Figure 1:
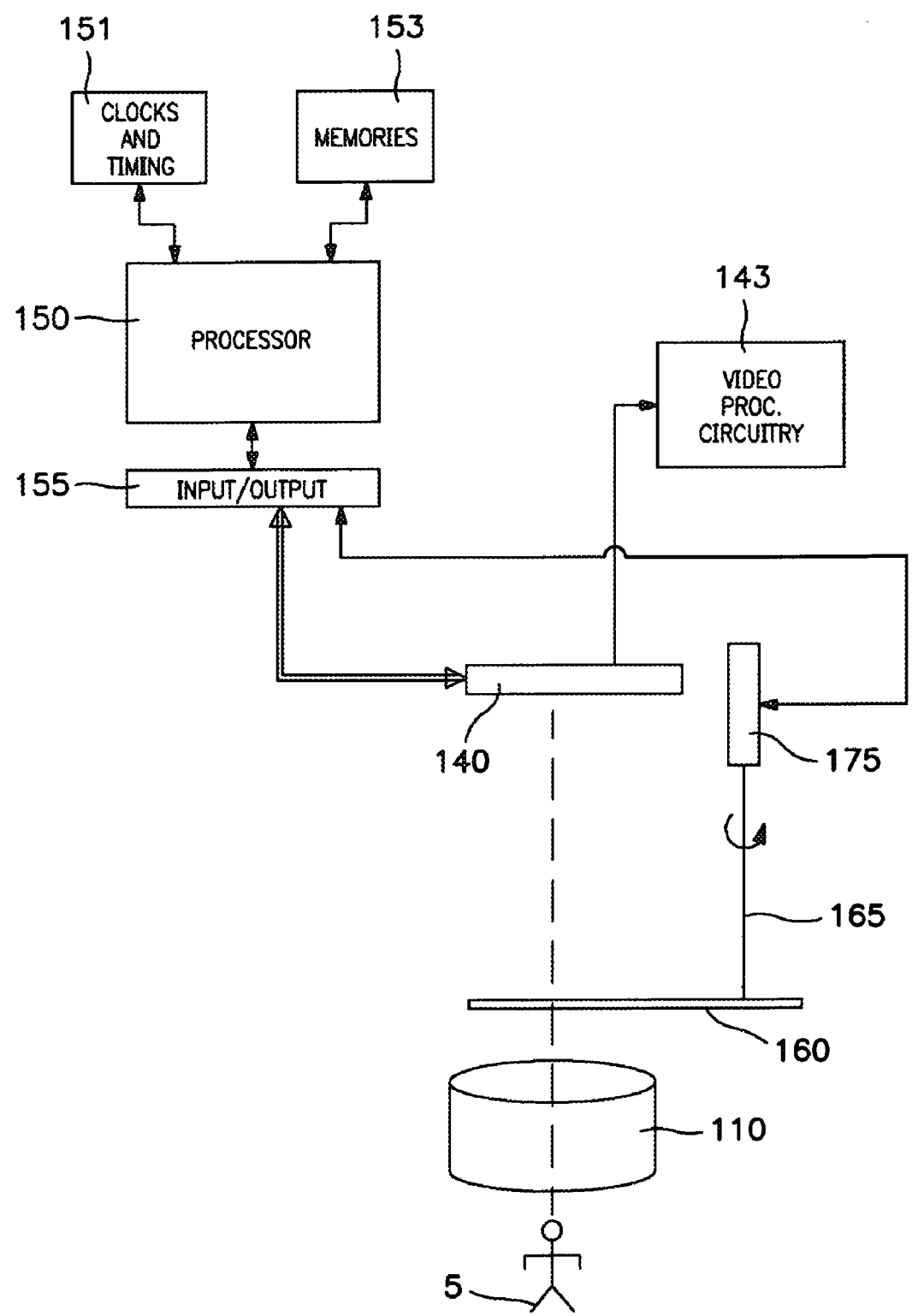
FIG. 1 is a diagram, partially in block form, of a system and method used in practicing embodiments of the invention.

FIG. 1 shows a camera system of the general type set forth in the above referenced U.S. patent application Ser. Nos. 09/653,983 and 09/954,969. Light received from a scene 5 being viewed (typically, a moving scene) is received and focused by a lens (which can be a motion picture film camera type of lens in a form hereof) represented in the Figure by lens 110, which may be a multi-element lens or lens system. (As used herein, the term "lens" is sometimes used as convenient shorthand for a lens system.) Light focused by the lens 110 is incident on one or more CCD sensors, represented in FIG. 1 by the CCD device 140. (As described in the above-referenced copending U.S. patent applications, a beamsplitter can be used to divide light from the image between sensors used, for example, in separate luminance and color channels. The present invention has application to CCD sensors for use in these and various other types of systems, and irrespective of the number of CCD sensors employed, the types of filters used therewith, etc.) A mechanical shutter 160 is driven on a shaft 165 by a motor 175. In an example hereof, the shutter duty cycle is fifty percent, although it will be understood that other suitable duty cycles can be employed. The output of the CCD device 140 is coupled to video processing circuitry 143, which produces, in known fashion, electronic video signals representative of the image. A processor 150, which may be, for example, any suitable microprocessor provided with clock and timing function (block 151), memories (block 153), and input/output function (block 155). The processor 150 controls the shutter rotation and also provides control signals to the CCD device, including timing signals that include, in the present embodiment, a pixel clock and two vertical shift clocks designated as clock A and clock B.

Figure 2:
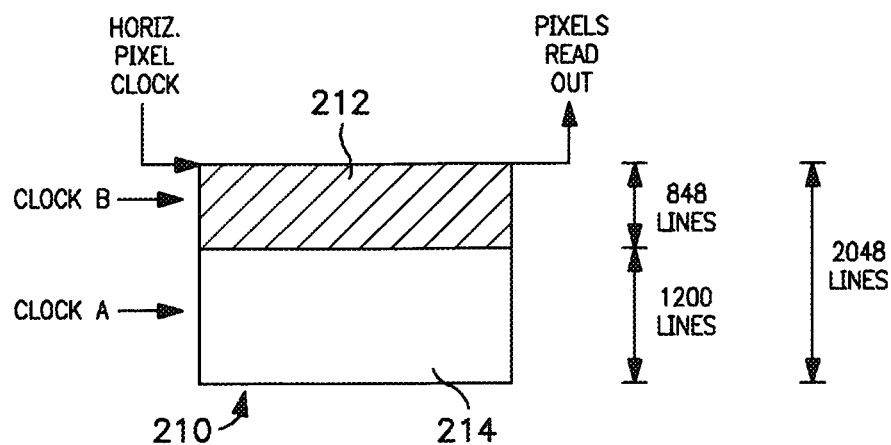
FIG. 2 shows a CCD device operative in accordance with an embodiment of the invention.

FIG. 2 illustrates operation of an embodiment of the invention. In the example of this embodiment, the CCD 210 is a 2048×2048 device, and 848 lines are masked (mask 212). Thus, the sensing area (214) includes 1200 lines and the storage area includes 848 lines. In this embodiment, the 1200 lines can be exposed for half the interval. When the shutter closes, 848 of the lines are clocked into the storage area during vertical blanking (as with a normal frame transfer CCD). This takes a little less time than normal since fewer lines are being transferred. At this time the shutter is still closed. The CCD can then start to read out the 1200 lines. By the time the shutter opens again for the next exposure, the remaining lines of the image will be under the opaque area. Read out can continue without vertical smear. This will give an image of 2048×1200 pixels. This is about 10% larger than the 1920×1080 recorded image. This can provide a 5% overscan on all four sides of the image. If this had been done in the traditional way, it would have required 2048×2400 pixels in the original CCD (15% more pixels).

Figure 3:
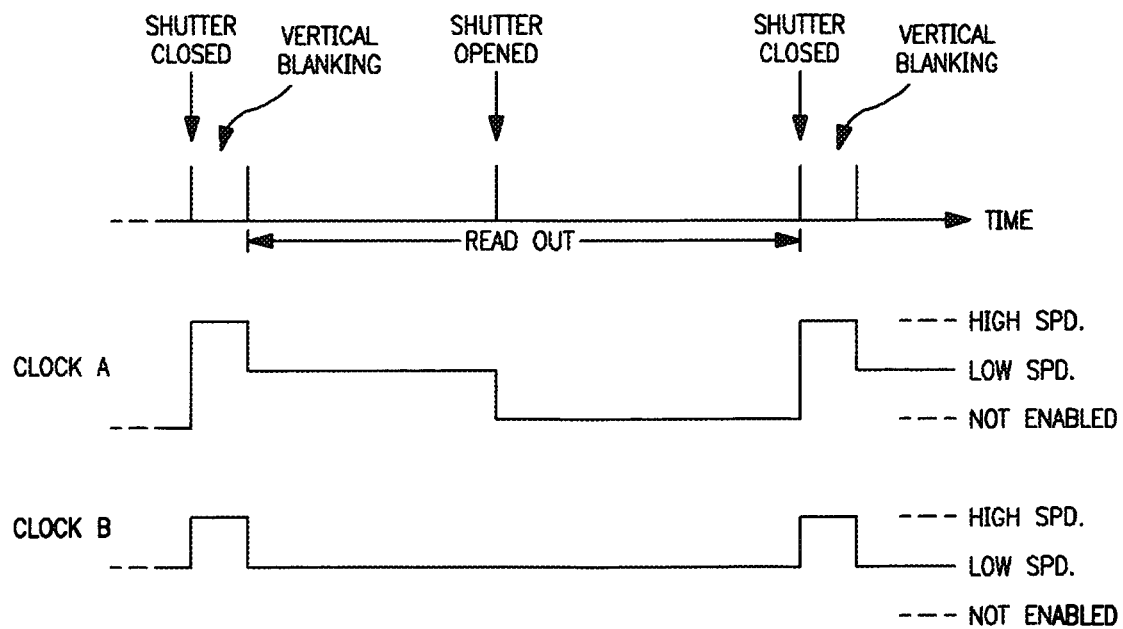
FIG. 3 shows a timing diagram for an embodiment of the invention.

In FIG. 2, the vertical clocks A and B and the horizontal clock P at the pixel rate, are represented by the arrows lettered as such. The timing diagram of FIG. 3 is useful in understanding operation. At the first (leftmost) timing point, the shutter is closed, and, during the subsequent vertical blanking period, 848 lines are shifted into the storage area by vertical clocks A and B operating at relatively high speed. During the remainder of the period that the shutter is closed, clocks A and B operate at relatively low speed as 352 lines are read out. Then, after the shutter opens, clock B (only) operates at relatively low speed, as the 848 lines under the storage area are read out. (During this time, the 1200 lines of pixels in the unmasked area are sensing the image.) The cycle then repeats.

The invention claimed is:

1. A method for producing electronic video signals representative of a focused moveable image, comprising the steps of:

provding a charge coupled sensor device, and masking substantially less than half of the lines of said device to form a masked storage area and a substantially larger unmasked sensing area;

disposing said sensing area in the path of said image;

providing a shutter for periodically blocking said image from said sensing area; and providing a first vertical clock, a second vertical clock, and a pixel rate clock;

said first vertical clock being operative to shift lines in the sensing area, said second vertical clock being operative to shift lines in the storage area, and said pixel rate clock being operative to clock out pixels from the storage area;

wherein, during a vertical blanking period after shutter closure, lines are shifted from the sensing area to fill the storage area using said first and second vertical clocks at relatively high speed and during the remainder of said shutter closure time further lines are shifted from the sensing area to the storage area and lines are shifted through the storage area and clocked out using said first and second vertical clocks at relatively low speed, and after shutter opening, lines in the storage area are clocked out using said second vertical clock at a relatively low speed.

2. The method as defined by claim 1, wherein said first vertical clock is disabled upon shutter opening.

3. The method as defined by claim 1, wherein the image stored on said charge coupled sensor device is overscanned on all four sides of the image.

4. The method as defined by claim 2, wherein the image stored on said charge coupled sensor device is overscanned on all four sides of the image.

5. The method as defined by claim 2, wherein said substantially larger unmasked sensing area includes at least 55 percent of the lines of said device.

6. The method as defined by claim 5, wherein said pixel rate clock is operative to clock pixels out of the last line of said storage area.

7. The method as defined by claim 1 wherein said substantially larger unmasked sensing area includes at least 55 percent of the lines of said device.

8. The method as defined by claim 1, wherein said pixel clock rate is operative to clock pixels out of the last line of said storage area.

* * * * *